United States Patent
Patel et al.

(10) Patent No.: US 10,412,126 B2
(45) Date of Patent: Sep. 10, 2019

(54) DETECTION AND AUTO-CORRECTION OF TALK PATH PROBLEMS IN COMMUNICATION SESSIONS

(71) Applicant: Avaya Inc., Santa Clara, CA (US)

(72) Inventors: Anirudh Patel, Pune (IN); Manish Patil, Pune (IN); Vivek Joshi, Pune (IN); Mani Sharma, Pune (IN)

(73) Assignee: Avaya Inc., Santa Clara, CA (US)

( * ) Notice: Subject to any disclaimer, the term of this patent is extended or adjusted under 35 U.S.C. 154(b) by 352 days.

(21) Appl. No.: 15/283,959

(22) Filed: Oct. 3, 2016

(65) Prior Publication Data

US 2018/0097854 A1  Apr. 5, 2018

(51) Int. Cl.
*H04L 29/06* (2006.01)
*H04L 12/26* (2006.01)

(52) U.S. Cl.
CPC ........ *H04L 65/1083* (2013.01); *H04L 43/065* (2013.01); *H04L 65/1053* (2013.01); *H04L 65/80* (2013.01); *H04L 43/087* (2013.01); *H04L 43/0829* (2013.01); *H04L 43/0864* (2013.01); *H04L 43/16* (2013.01)

(58) Field of Classification Search
CPC ............. H04L 43/0829; H04L 43/0864; H04L 43/087; H04L 43/16; H04L 43/065; H04L 65/1083; H04L 65/1093; H04L 65/608; H04L 65/80; H04L 61/309
See application file for complete search history.

(56) References Cited

U.S. PATENT DOCUMENTS

| | | | |
|---|---|---|---|
| 2002/0026503 A1* | 2/2002 | Bendinelli | H04L 12/4641 709/220 |
| 2006/0142001 A1* | 6/2006 | Moisan | H04L 41/5009 455/428 |
| 2009/0296827 A1* | 12/2009 | Karaoguz | H04N 21/23439 375/240.26 |
| 2012/0089728 A1* | 4/2012 | Deruijter | H04L 65/105 709/224 |
| 2012/0176902 A1* | 7/2012 | Dinan | H04L 43/0882 370/237 |
| 2013/0152153 A1* | 6/2013 | Weiser | H04L 63/0236 726/1 |

(Continued)

FOREIGN PATENT DOCUMENTS

KR  101658470 B1 * 9/2016

OTHER PUBLICATIONS

U.S. Appl. No. 15/052,484, filed Feb. 24, 2016, Patel.

*Primary Examiner* — Michael C Lai
(74) *Attorney, Agent, or Firm* — Sheridan Ross P.C.

(57) ABSTRACT

Statistics of a media stream of a communication session are received from one or more communication devices involved in the communication session. The statistics are from various communication devices that are involved in the media stream of the communication session. A determination is made to see if at least one of the statistics from one of the communication devices meets a threshold. In response to the at least one of the statistics meeting the threshold, a message is sent to dynamically change a configuration the media stream of the communication session while the communication session is still active. For example, the message may be to switch to a different media server in order to improve the quality of the media stream.

20 Claims, 5 Drawing Sheets

(56) References Cited

U.S. PATENT DOCUMENTS

| | | | |
|---|---|---|---|
| 2013/0212242 A1* | 8/2013 | Mendiratta | H04L 65/1069 709/223 |
| 2015/0017976 A1* | 1/2015 | Liu | H04W 76/19 455/423 |
| 2016/0056927 A1* | 2/2016 | Liu | H04W 28/04 370/216 |
| 2017/0201440 A1* | 7/2017 | Joshi | H04L 43/0852 |
| 2017/0245191 A1* | 8/2017 | Patel | H04W 36/30 |

* cited by examiner

DETECTION AND AUTO-CORRECTION OF TALK PATH PROBLEMS IN COMMUNICATION SESSIONS

BACKGROUND

When a communication session, such as a voice or video communication session is established, problems can arise for different communication endpoints in the communication session. For example, a voice signal from an individual communication endpoint may sound distorted in the communication session. When these types of problems occur, a typical solution is to drop the communication session and attempt to have all the communication endpoints reestablish the communication session. In some cases, this still does not resolve the problem, which leads to frustration by users of the communication session.

SUMMARY

These and other needs are addressed by the various embodiments and configurations of the present disclosure. Statistics of a media stream of a communication session are received from one or more communication devices involved in the communication session. The statistics are from various communication devices that are involved in the media stream of the communication session. A determination is made to see if at least one of the statistics from one of the communication devices meets a threshold. In response to the at least one of the statistics meeting the threshold, a message is sent to dynamically change a configuration the media stream of the communication session while the communication session is still active. For example, the message may be to switch to a different media server in order to improve the quality of the media stream.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
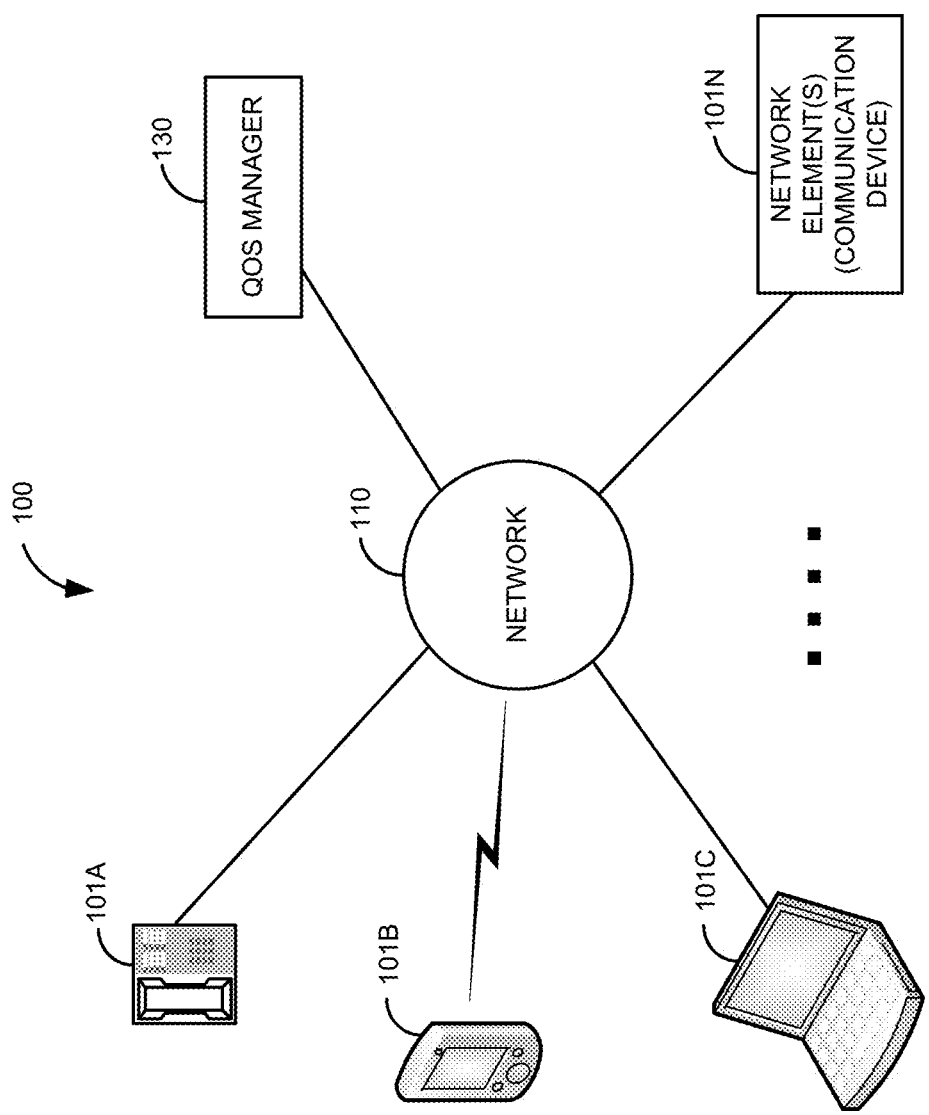
FIG. 1 is a block diagram of a first illustrative system for detecting and correcting media stream problems in a communication session.

FIG. 1 is a block diagram of a first illustrative system 100 for detecting and correcting media stream problems in a communication session. The first illustrative system 100 comprises communication devices 101A-101N, a network 110, and a Quality-of-Service (QoS) manager 130.

The communication devices 101A-101N can be or may include any device that can participate in a media stream of a communication session, such as a Personal Computer (PC), a telephone, a video system, a cellular telephone, a Personal Digital Assistant (PDA), a tablet device, a notebook device, a smart phone, a media server, a media resource, a video server, a Private Branch Exchange (PBX), a server with a Back-to-Back User Agent (B2BUA), a proxy server, a conference bridge, a router, a recorder, a voice translator, a voice-to-text converter, a Session Border Controller (SBC), an Interactive Voice Response (IVR) system, and/or the like. As shown in FIG. 1, any number of communication devices 101A-101N may be connected to the network 110.

In FIG. 1, the communication devices 101A-101C are communication endpoints. A communication endpoint is a communication device 101 where a communication session terminates. For example, a communication endpoint can be a PC, a telephone, a video system, a cellular telephone, a PDA, a tablet device, a notebook device, a smart phone, an IVR system, a recorder, and/or the like. Although only three communication devices 101A-101C that are communication endpoints are shown in FIG. 1, any number of communication endpoints may be connected to the network 110.

The communication device 101N is representative of a network element that is part of a media stream. For example the communication device 101N may be a media server, a media resource, a Private Branch Exchange (PBX), a server with a Back-to-Back User Agent (B2BUA), a session manager, a communication manager, a proxy server, a conference bridge, a router, a SBC, a voice translator, a voice-to-text converter, and/or the like. The communication device 101N that is a network element may comprise multiple network elements. For example, the communication device 101N may comprise a one or more PBXs, routers, proxy servers, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a video network, a combination of these, and the like. The network 110 can use a variety of electronic protocols, such as Ethernet, Internet Protocol (IP), Session Initiation Protocol (SIP), Session Description Protocol (SDP), Real-Time Communication Protocol (RTCP), Integrated Services Digital Network (ISDN), Web Real-Time Communication (WebRTC) protocol, Hyper Text Transfer Protocol (HTTP), Simple Network Management Protocol (SNMP) and/or the like. Thus, the network 110 is an electronic communication network configured to carry messages via packets and/or circuit switched communications.

The Quality-of-Service (QOS) manager 130 can be any communication device that can receive and send messages on the network 110, such as, a PC, a server, a proxy server, a virtual machine, a network manager, a SNMP server, and/or the like. The QOS manager 130 can be administered by an administrator or user to set or define different QOS thresholds for media streams.

The system of FIG. 1 is used to establish communication sessions in standard fashion. The communication sessions may use various protocols, such as SIP, SDP, RTCP, H.323, WebRTC, video protocols, and/or the like. For example, a communication session may be established using SIP as defined in RFC 3261 "SIP: Session Initiation Protocol," Network Working Group, June, 2002, which is incorporated herein in its entirety by reference.

In another example, a video communication session may be established from the communication device 101B to the communication device 101C via a PBX (communication device 101N). The media stream goes through the PBX 101N. In this example, there are three communication devices (101B, 101C, and 101N) involved in the media stream.

A voice communication session may be established using a SIP proxy server (101N) between the communication devices 101A and 101C. In this example, the media stream is a direct RTP media stream between the communication devices 101A and 101C. In this example, only the communication devices 101A and 101C are involved in the media stream. The SIP proxy server (101N) is only involved in the signaling channel of the communication session and not the media stream.

Alternatively, a voice conference call can be established between the communication devices 101A and 101C using SIP. As part of the voice conference call, the communication device 101N (a conference bridge) mixes media streams of each of the communication devices 101A-101C. The media stream for the conference call is established using SDP and RTP. In this example, there are four communication devices (101A-101N) that are involved in the media stream of the conference call.

In other embodiments, multiple communication devices 101/applications may be involved in a media stream. For example, a media stream of a communication session between the communication devices 101A and 101B may also have a media server 101 and one or more B2BUAs that both see the media stream that is sent between the communication devices 101A and 101B. For example, the B2BUA(s) may be a recorder of the media stream and/or a voice-to-text translator of the media stream.

Figure 2:
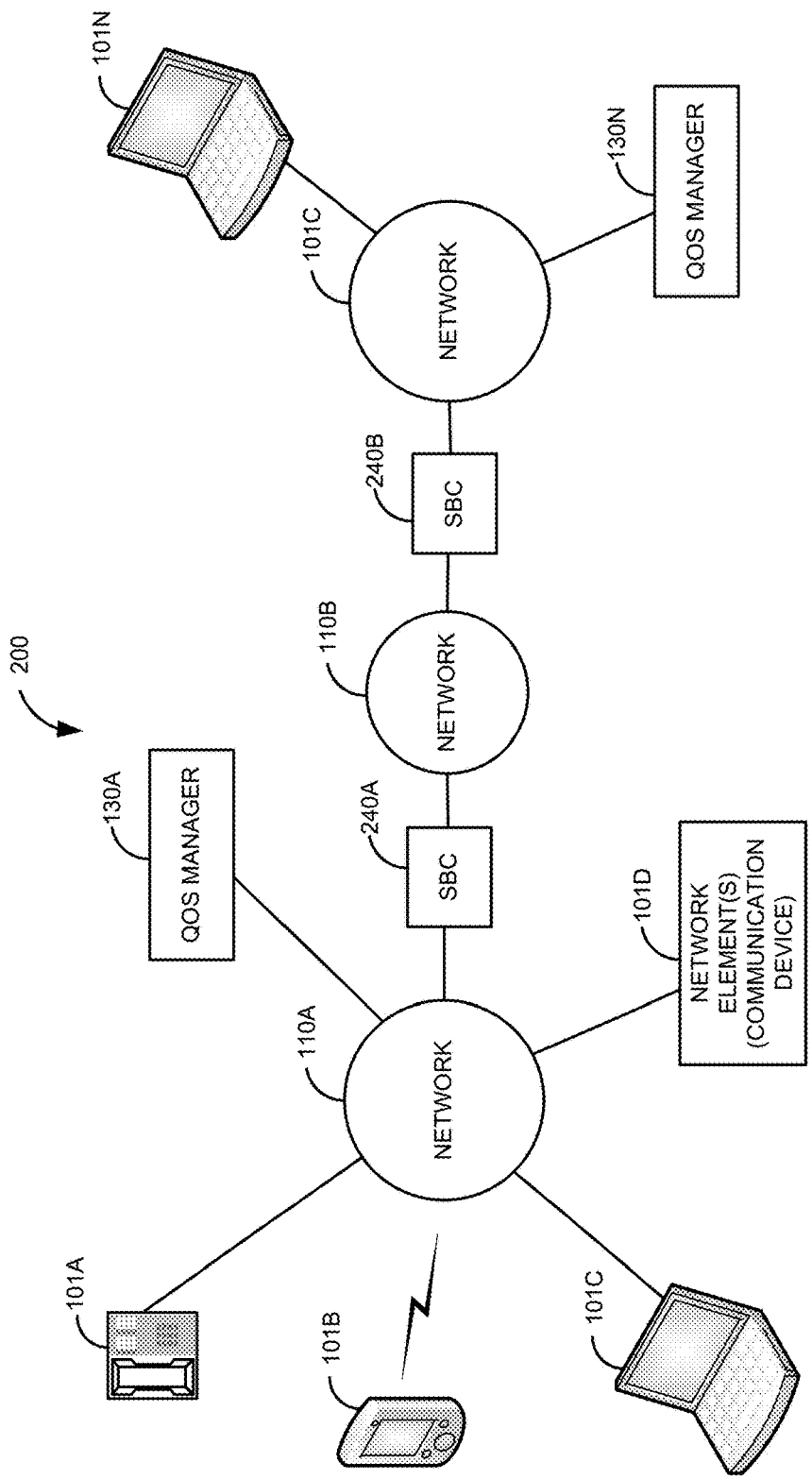
FIG. 2 is a block diagram of a second illustrative system of a redundant system for detecting and correcting media stream problems in a communication session.

FIG. 2 is a block diagram of a second illustrative system 200 of a redundant system for detecting and correcting media stream problems in a communication session. The second illustrative system 200 comprises the communication endpoints 101A-101N, networks 110A-110C, QOS managers 130A-130N, and Session Border Controllers 240A-240B. FIG. 2 is an example of a distributed communications network. For example, the networks 110A and 110C may be different corporate networks that are connected via the Internet 110B.

In FIG. 2, there are a plurality of QOS managers 130A-130N. The QOS manager 130A is a primary QOS manager 130 and the QOS manager 130N is a secondary QOS manager 130. If the primary QOS manager 130A fails or is unreachable, the secondary QOS manager 130N can take over duties of the primary QOS manager 130A. The QOS managers 130A-130N may be part of a cloud service that is provided by a third party.

The SBCs 240A-240B can be any hardware coupled with software that can provide protection services for the networks 110A and 110C, such as a firewall, a Network Address Translator (NAT), and/or the like. The SBCs 240A-240B are also a communication device 101 that may be part of a media stream.

In FIG. 2, communication sessions may go between the networks 110A and 110C. For example, a voice communication session may be established between the communication device 101A and the communication device 101N via the PBX 101D and the SBCs 240A and 240B. In this example, there are five communication devices (101A, 101D, 101N, 240A, and 240B) involved in the media stream.

Figure 3:
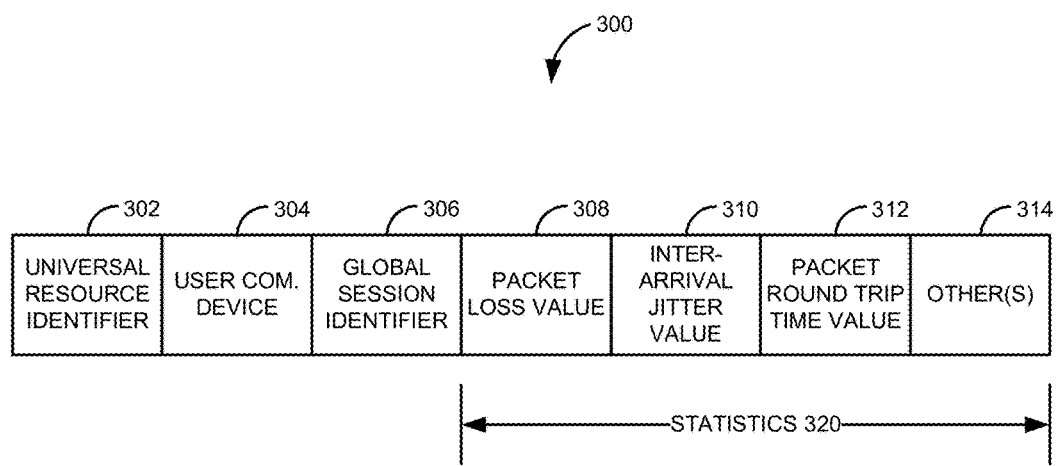
FIG. 3 is a diagram of a statistics packet for detecting media stream problems in a communication session.

FIG. 3 is a diagram of a statistics packet 300 for detecting media stream problems in a communication session. The statistics packet 300 is sent by the communication devices 101 (those involved in the media stream) during an active communication session to the QOS server 130 (e.g., as shown in FIG. 1). Alternatively, if there are redundant QOS servers 130A-130N as described in FIG. 2, the communication devices 101A-101N involved in the media stream can send the statistics packet(s) 300 to all the QOS servers 130A-130N.

The statistics packet 300 can be sent using various protocols, such as SIP, SDP, WebRTC, video protocols, IP, TCP, UDP, and/or the like. For example, the statistics packet 300 may be sent using SIP NOTIFY/PUBLISH messages or a proprietary message.

The statistics packet 300 comprises a Universal Resource Identifier (URID) 302, a user communication device field 304, a Global Session Identifier (GSID) 306, a packet loss value 308, a inter-arrival jitter value 310, a packet round trip time value 312, and other fields 314. The packet loss value 308, the inter-arrival jitter value 310, the packet round trip time value 312, and the other fields 314 are statistics 320 of a communication session.

The URID 302 is an identifier that uniquely identifies a resource of the communication session. The URID 302 may be a unique number, a unique text string, an address, a telephone number, and/or the like. For example, the resource of the URID 302 may be associated with a person who has one or more communication devices 101, such a user named Bob who works for the company Avaya (bob@avaya.com). The URID 302 may be associated with a communication device 101 that is a network element, such as a conference bridge or an IVR system.

If the user has multiple communication devices 101 (e.g., a cell phone and a desktop phone), associated with a URID 302, the user communication device field 304 is used to identify a specific communication device 101 of the user. For example, the user communication device field 304 may identify the communication device 101A for a desktop phone of the user bob@avaya.com in one statistics packet 300 and the user communication device field 304 may identify the communication device 101B for Bob's mobile communication device in a different statistics packet 300.

The global session identifier 306 is a unique identifier for the communication session. The global session identifier 306 is used to uniquely identify the communication session/media stream and specific problems in the media stream.

The packet loss value 308 is an identifier that identifies a number of packets that were lost in a media stream. The packet loss value 308 may be based on an actual number of packets sent versus the actual packets that were lost. The packet loss value 308 may be a percentage. The packet loss value 308 may be used to identify a communication device 101 or communication link that is experiencing a high number of lost packets.

The inter-arrival jitter value 310 is used to identify jitter problems, such as, delayed packets or out-of-order packets. If packets in a real-time media stream are delayed, the media stream may look and/or sound choppy. The inter-arrival jitter value 310 can be used to identify a specific communication device 101 that is experiencing jitter problems from delayed packets.

The packet round trip time value 312 is used to determine a round trip time of a packet to show the overall time of a media stream. This can be used to identify a specific media stream that is experiencing congestion that causes packet delay in a network 110.

The other(s) field 314 can be used to send other statistics, such as packet retransmissions, failed or dropped communication sessions, bad Cyclic Redundancy Checks (CRCs), and/or the like.

The statistics packet 300 of FIG. 3 has defined statistics 320 that include the packet loss value 308, the inter-arrival jitter value 310, and the packet round trip time value 312. However, one of skill in the art would recognize that a subset of the statistics 320 or completely different statistics 320 may be in the statistics packet 300. For example, a communication device 101 may send a statistics packet 300 when a packet loss value exceeds a number of lost packets in a time period. In this case, the inter-arrival jitter value 310 and the packet round trip value are not necessary to send in the statistics packet 300. Alternatively, only the packet loss value 308 is sent for all statistics packets 300.

Figure 4:
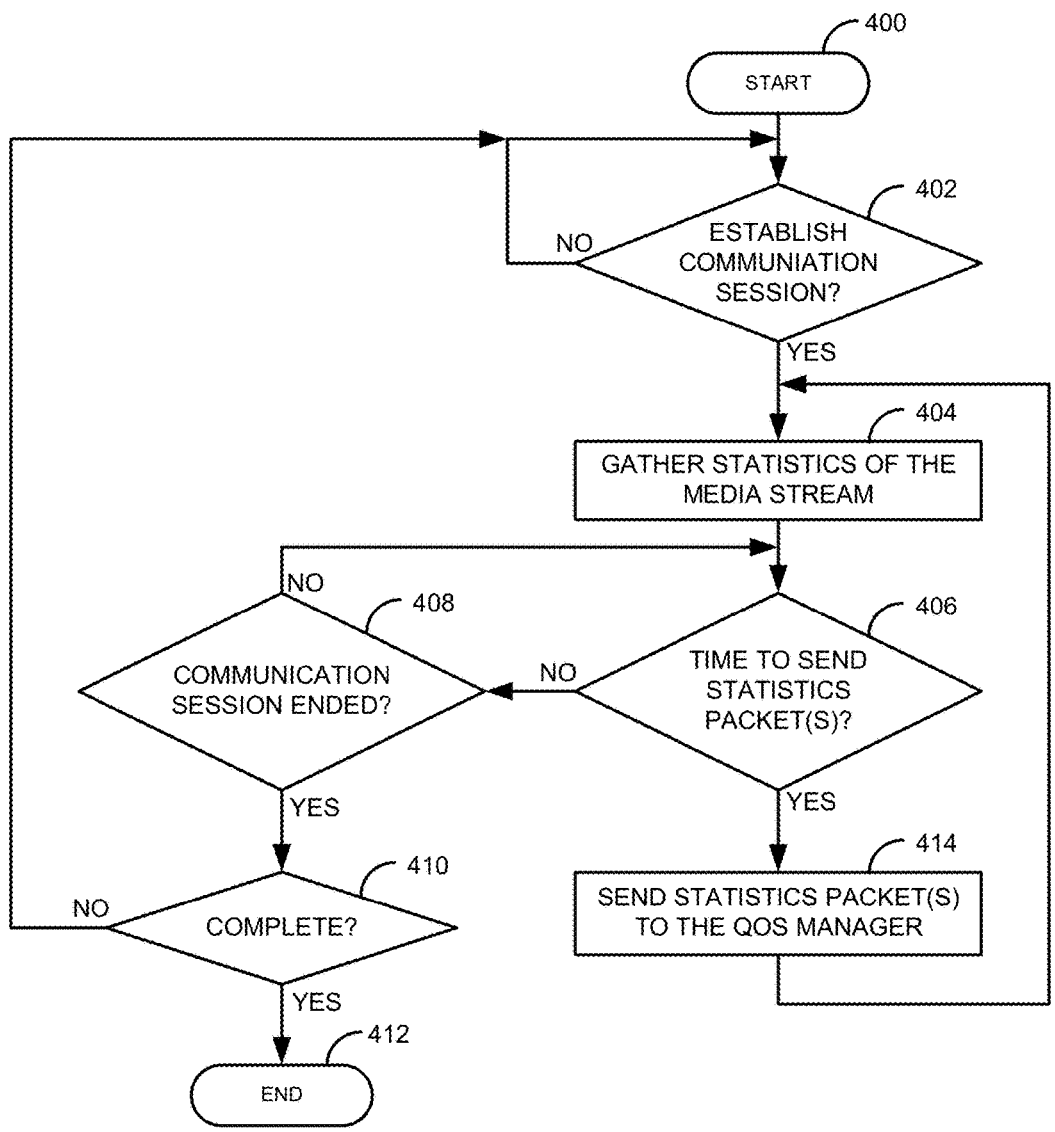
FIG. 4 is a flow diagram of a communication device gathering statistics for a media stream.
Figure 5:
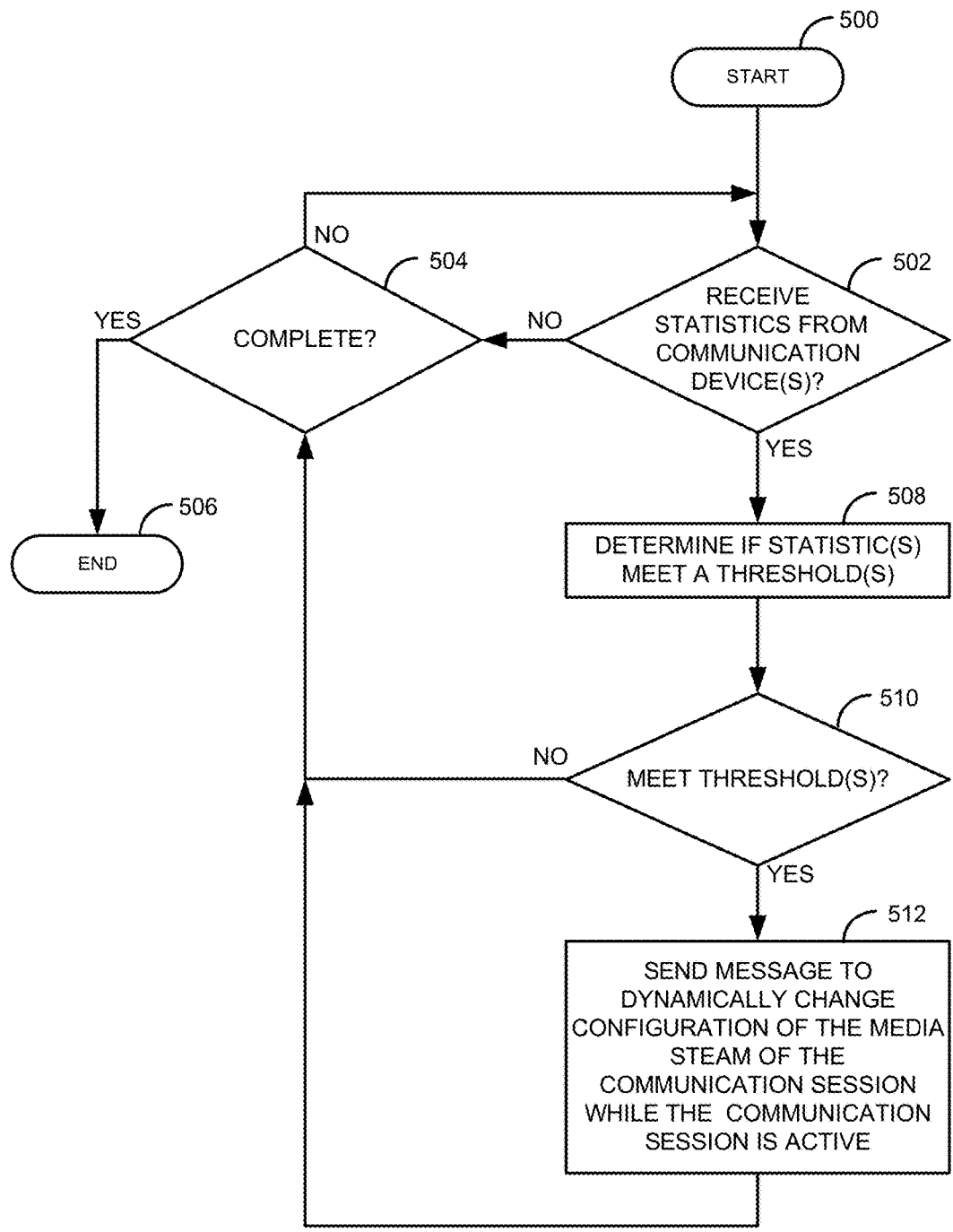
FIG. 5 is a flow diagram of a process for detecting and correcting media stream problems in a communication session.

FIG. 4 is a flow diagram of a communication device 101 gathering statistics for a media stream. Illustratively, the communication devices 101A-101N, the networks 110A-110C, the QOS managers 130A-130N, and the SBCs 240A-240B are stored-program-controlled entities, such as a computer or microprocessor, which performs the methods of FIGS. 4-5 and the processes described herein by executing program instructions stored in a computer readable storage medium, such as a memory or disk. Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

FIG. 4 is from the view point of a communication device 101. The communication device 101 may be a communication endpoint or a network element. The process starts in step 400. The communication device 101 determines, in step 402, if a communication session has been established. If a communication session has not been established in step 402, the process of step 402 repeats.

Otherwise, if a communication session has been established in step 402, the communication device 101 gathers statistics of the media stream of the communication session in step 404. The communication device 101 can gather statistics in various ways. For example, standard RTCP packets that are sent between communication devices 101 in a media stream comprise a Sender SSRC field. The SSRC field identifies the sender of the RTCP packet. The sender may be a telephone number, a user identifier (e.g., alice@avaya.com), and/or the like. The RTCP packets also comprise a identifier of receiver of the RTCP packet. The identifier of the receiver of the RTCP packet can be a phone number, a user identifier (e.g., bob@avaya.com), and/or the like. The SSRC field and the recipient of the RTCP packet can be used as the URID 302. The RTCP packets also comprise a CNAME identifier (e.g., Alice@135.27.152.232) that identifiers the user communication device 304.

Other fields can be added to standard RTCP packets, such as a global session identifier 306. A global session identifier 306 is used where there are multiple SIP dialogs in a communication session. For example in a conference call, there would be separate SIP dialogs for each leg of the conference call each with different session identifiers. The Global session identifier 306 is used to identify the overall conference call.

Standard RTCP also includes fields that identify packet loss value 306, inter-arrival jitter values 310, and packet round trip time value 312. By using standard and/or additional information in RTCP packets, the communication devices 101 can gather statistics for sending statistics packets 300 in step 404.

The communication device 101 determines, in step 406, if it is time to send a statistics packet(s) 300 to the QOS manager(s) 130. The communication device 101 can determine if it is time to send a statistics packet(s) 300 in step 406 based on various criteria, such as, in a defined period of time, based on a number of packets received, based on a defined number of errors (e.g., packet loss in the media stream, high jitter, long round trip packet time, etc.), based on a type of media stream (e.g., video or voice), based on a dropped communication session, and/or the like.

If it is not time to send a statistics packet(s) 300 in step 406, the communication device 101 determines, in step 408, if the communication session has ended. If the communication session has not ended in step 408, the process goes back to step 406. Otherwise, if the communication session has ended in step 408, the communication device 101 determines if the process is completed in step 410. If the process is complete in step 410, the process ends in step 412. Otherwise, if the process has not completed in step 410, the process goes back to step 402 to wait for the next communication session.

If it is time to send the statistics packet(s) 300 in step 406, the communication device 101 sends, in step 414, one or more statistics packets 300 to the QOS manager(s) 130. If there are redundant QOS managers 130, the communication device 101 sends the one or more statistics packets 300 to the QOS managers 130A-130N. The process then goes to step 404 where the communication device 101 gathers statistics of the media stream.

FIG. 5 is a flow diagram of a process for detecting and correcting media stream problems in a communication session. The process starts in step 500. The QOS manager 130 determines, in step 502, if a statistics packet(s) 300 has been received from one or more of the communication devices 101. If a statistics packet(s) 300 has not been received in step 502, the QOS manager 130 determines, in step 504, if the process is complete. If the process is complete in step 504, the process ends in step 506. Otherwise, if the process is not complete in step 504, the process goes back to step 502.

If a statistics packet(s) 300 has been received from one or more of the communication devices 101 in step 502, the QOS manager 130 determines, in step 508 if the statistics 320 in the statistics packet 300 meet a threshold(s). A threshold can be a default threshold, an administered threshold, a threshold based on a history, and/or the like. The threshold may comprise multiple thresholds for different statistics 320. For example, different thresholds may be defined for the packet loss value 308, the inter-arrival jitter value 310, and the packet round trip time value 312. The different thresholds may be defined differently for an individual communication device 101. For example, a 2% packet loss threshold may be defined for the communication device 101A and a 5% packet loss threshold may be defined for the communication device 101C. A threshold for an individual communication device 101 may be turned off. A threshold can be met in different ways. For example, a threshold can be met when a value is reached, when a value is exceeded, when a value drops below the threshold, and/or the like. A threshold may be for one or more of the statistics 320. For example, only a single threshold may be defined for the inter-arrival jitter value 310 while there are no thresholds defined for the packet loss value 308 and the packet round trip time value 312. A threshold may be met based on a accumulation of statistic 320 in multiple statistics packets 300. A threshold may be based on two or more statistics reaching a respective threshold. For example, if a 4% lost packet threshold and an inter-arrival jitter value of 5 is reached, the threshold may be considered to have been met in step 508.

Meeting a threshold in step 508 may indicate a temporary problem associated with a communication device 101, such as, a temporary network glitch or a intensive operation being executed on a communication endpoint that causes problems in a softclient. In cases of temporary problems, averaging statistics over time can nullify the effect. If the glitch is long lasting, the averaging of statistics will cause the threshold to be exceeded. The statistics may be captured over multiple calls to identify a trend from a specific communication device(s) 101 that may be experiencing a problem. A network administrator can then isolate communication devices 101 that are experiencing persistent problems. The administrator can then take action as necessary to resolve the problem.

If the statistics do not meet a threshold, in step 510, the process goes to step 504. Otherwise, if the statistics 320 meet a threshold in step 510, the QOS manager 130 sends, in step 512, a message to dynamically change a configuration of the media stream of the communication session. The QOS manager 130 uses the URID 302, user communication device 304 (if the URID is a user with multiple communication devices 101) and the GSID 306 to uniquely identify the particular communication device 101 (link, or path)/communication session where the threshold was met. Based on the type of statistic (e.g., 308, 310, 312 or 314), the message and the effect of the message may be different.

For example, assume that the communication session is a voice call between the communication devices 101A and 101C. Also assume that statistics packet 300 received in step 502 has a URID=bob@avaya.com; user communication device=101A; SID=0xbacdef12; packet loss value=10%; inter-arrival jitter value=2; and packet round trip time value=200 ms. The threshold for packet loss value 308 is defined to be a maximum of 2%. The packet loss value 308 of 10% in the statistics packet 300 is over the 2% maximum in step 508. The QOS manager 130, based on a defined set of rules where Bob has a second communication device 101, dynamically changes the configuration of the voice media stream of the communication session by sending, in step 512, a message to a PBX to add a second communication device 101B of Bob to the media stream of the communication session (0xbacdef12).

In another illustrative example, assume that the communication session is a video conference call between the communication devices 101A-101N, where the communication device 101D is a conference bridge. Also assume that statistics packet 300 received in step 502 has a URID=27131001@148.147.203.62 (a phone number/IP address of a conference bridge); user communication device=null; SID=0xbacdef12; packet loss value=10%; inter-arrival jitter value=3; and packet round trip time value=100 ms. The threshold for packet loss is defined to be a maximum of 2%. The packet loss value 308 of 10% in the statistics packet 300 is over the 2% maximum in step 508. The QOS manager 130, based on a defined set of rules, dynamically changes the configuration of the video media stream of the communication session by sending an instruction for a second conference bridge to dynamically replace a first conference bridge in a conference call.

In another illustrative example, assume that a user at the communication device 101C is streaming a video stream from a media server 101D. Also assume that statistics packet 300 received in step 502 has a URID=148.147.203.62 (a IP address of the media server 101D); user communication device=null; SID=0xbacdef12; packet loss value=1%; inter-arrival jitter value=6; and packet round trip time value=null. The threshold for the inter-arrival jitter value 310 is a maximum of 2. The inter-arrival jitter value 310 of 6 is above the maximum of 2 in step 508. The QOS manager 130, based on a defined set of rules, dynamically changes the configuration of the media stream of the communication session by sending an instruction (e.g., by publishing information to a call server) to dynamically shuffle the media stream of the communication session to a different media server 101.

The message of step 512 may vary based on one or more thresholds being met. The message of step 512 may be based on different rules. For example, the rule may be to dynamically change the configuration of the media stream of the communication session by sending an instruction to the communication device 101 identified by the URID 302 to switch to second (a lower bandwidth codec) in the media stream. By switching to a lower bandwidth codec, the communication device 101 may have fewer lost packets and a lower jitter.

The message of step 512 may be an instruction to use an alternate number. For example, if the communication device 101A is in the communication session, the phone number for the communication device 101B (an alternate number) may be used while the communication session with the communication device 101A is dropped.

The message of step 512 may be an instruction to change a route of the media stream of the communication session. For example, the message of step 512 may be sent to a router to change a route of the media stream.

The message of step 512 may be an instruction to re-queue the communication session using a higher priority after playing a preconfigured announcement. For example, if the communication session is a voice communication that is experiencing high packet loss/jitter, a message may be played to the users that the voice call will be placed on hold in order to reestablish the communication session using a higher routing priority.

The message of step 512 may be an instruction to reboot a media resource. For example the message of step 512 may be sent to a media server to tell the media server to reboot. Once the media server has rebooted, the communication session is reestablished. The user could be informed of the reboot by playing a message to the user.

The message of step 512 may be an instruction to use a different Private Branch Exchange (PBX). For example, if the statistics 320 of the PBX (101D) indicates a high packet loss in one or more communication sessions, the message of step 512 may instruct a second PBX to take over the communication session.

The message of step 512 may be an instruction to temporarily log out a user from a communication device 101. For example, the message may be to log the user out and then re-log the user in.

The message of step 512 may be an instruction to terminate the communication session for one or more alternate communication devices 101 of the user. For example, if two communication devices 101 of the user bob@avaya.com are part of the communication session, the message of step 512 may be to terminate the communication session for one of the communication devices 101 of Bob.

The message of step 512 may be an instruction to disable a Back-to-Back User Agent (B2BUA) in the media stream. In SIP, it is common practice to insert a B2BUA into the media stream. For example, the B2BUA may be an application that provides call recording based on a caller ID. If the B2BUA is identified as meeting the threshold (e.g., the packet round trip time value 312 is high because the B2BUA has been inserted into the media stream, the B2BUA may be disabled (i.e., removed from the media stream) in order to reduce packet round trip time. Similarly, the message of step 512 may be an instruction to switch a first B2BUA in the media stream with a second B2BUA based on exceeding a threshold.

The message of step 512 may be an instruction to switch a first recorder in the media stream with a second recorder. For example, the recorder may have a hardware problem that is causing high packet lost between communication devices 101 (endpoints).

The message of step 512 may be an instruction to remove a first voice translator from the media stream. For example, if the threshold indicates that the voice translator is causing packet loss or is failing, the message may be to remove the voice translator from the media stream. Similarly, the message of step 512 may be an instruction to switch a first voice translator of the media stream with a second voice translator.

The message of step 512 may be an instruction to remove a first voice-to-text converter of the media stream. For example, if the threshold indicates that the voice-to-text converter is causing jitter, the message of step 512 may be to remove the voice-to-text converter from the media stream. Similarly, the message of step 512 may be an instruction to switch from a first voice-to-text converter of the media stream to a second voice-to-text converter.

The message of step 512 may be an instruction to start a new virtual thread for an application in the media stream and switch to the new virtual thread for the application in the media stream. For example, the application may be a B2BUA and the instruction is to start a new instance of the B2BUA and switch the path of the media stream to go through the new instance of the B2BUA.

The message of step 512 may be an instruction to switch from a first Session Border Controller (SBC) 240 to a second SBC 240. The instruction may be to switch a specific element of the SBC 240, such as a NAT in the SBC 240 (i.e., bring up a new thread of the NAT).

The message of step 512 may be an instruction to switch from a first Interactive Voice Response (IVR) system to a second IVR system. For example, if the IVR system is causing a high packet loss, the message may be sent to a controller to switch the user to a second IVR while keeping the state of the current IVR (e.g., which menu is currently being used).

The message of step 512 may be an instruction to reboot the one of the plurality of communication devices 101. For example, if the communication device 101A is having packet loss problems, the message may be sent to the communication device 101A to reboot the communication device 101A.

The different messages of step 512 described above may be used at the same time. For example, the message of step 512 may instruct the communication device 101 to use a new codec and may also instruct a router to change a route of the media stream.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to:
receive statistics of a media stream of a communication session from one or more communication devices involved in the communication session;
determine that at least one of the statistics from the one or more communication devices meets a threshold; and
send a message to dynamically change a configuration of the media stream of the communication session, while the communication session is still active, in response to the determination that at least one of the statistics meets the threshold.

2. The system of claim 1, wherein the media stream of the communication session is a Real-Time Communication Protocol (RTCP) media stream, wherein the statistics of the RTCP media stream are received in one or more messages from respective communication devices in the communication session, wherein the one or more messages comprise a Universal Resource Identifier (URI) of a respective communication device and a Global Session Identifier (GSID) of the communication session.

3. The system of claim 2, wherein the URI of the respective communication device further comprises a user communication device identifier that identifies a specific communication device of a user.

4. The system of claim 2, wherein the statistics of the RTCP media stream comprise one of a packet loss value, an inter-arrival jitter value, and a packet round trip time value.

5. The system of claim 1, wherein one of the one or more communication devices is a first communication device of a user and wherein the message to dynamically change the configuration of the media stream of the communication session is an instruction to add a second communication device of the user to the communication session.

6. The system of claim 1, wherein the communication session is a conference call, wherein one of the one or more communication devices is a first conference bridge, and wherein the message to dynamically change the configuration of the media stream of the communication session is an instruction for a second conference bridge to dynamically replace the first conference bridge in the conference call.

7. The system of claim 1, wherein one of the one or more communication devices is a media server and wherein the message to dynamically change the configuration of the media stream of the communication session is an instruction to dynamically shuffle the media stream of the communication session to a different media server.

8. The method of claim 1, wherein one of the one or more communication devices uses a first codec for the media stream of the communication session and wherein the message to dynamically change the configuration of the media stream of the communication session is an instruction for the one of the one or more communication devices to switch to a second codec for the media stream of the communication session.

9. The system of claim 1, wherein the threshold is different for different ones of the one or more communication devices.

10. The system of claim 1, wherein the message to dynamically change the configuration of the media stream of the communication session is one of:
an instruction to use an alternate number;
an instruction to change a route of the media stream of the communication session;
an instruction to re-queue the communication session using a higher priority after playing a preconfigured announcement;
an instruction to reboot a media resource;

an instruction to use a different Private Branch Exchange (PBX);

an instruction to temporarily log out one of the one or more communication devices;

an instruction to terminate the communication session for one or more alternate communication devices of a user;

an instruction to disable a first Back-to-Back User Agent (B2BUA) in the media stream;

an instruction to switch the first B2BUA in the media stream with a second B2BUA;

an instruction to switch a first recorder in the media stream with a second recorder;

an instruction to remove a first voice translator from the media stream;

an instruction to switch the first voice translator of the media stream with a second voice translator;

an instruction to remove a first voice-to-text converter of the media stream;

an instruction to switch from the first voice-to-text converter of the media stream to a second voice-to-text converter;

an instruction to switch from a first Session Border Controller (SBC) to a second SBC;

an instruction to start a new virtual thread for an application in the media stream and switch to the new virtual thread for the application in the media stream;

an instruction to switch from a first Interactive Voice Response (IVR) system to a second IVR system; or an instruction to reboot the one of the one or more communication devices.

11. The system of claim 1, wherein the statistics of a media stream of the communication session from the one or more communication devices involved in the communication session are received at a primary Quality of Service Manager.

12. A method comprising:
receiving, by a microprocessor, statistics of a media stream of a communication session from one or more communication devices involved in the communication session;
determining, by the microprocessor, that at least one of the statistics from the one or more communication devices meets a threshold; and
in response to the determining that at least one of the statistics meets the threshold, sending, by the microprocessor, a message to dynamically change a configuration of the media stream of the communication session while the communication session is still active.

13. The method of claim 12, wherein the media stream of the communication session is a Real-Time Communication Protocol (RTCP) media stream, wherein the statistics of the RTCP media stream are received in one or more messages from respective communication devices in the communication session, wherein the one or more messages comprise a Universal Resource Identifier (URI) of a respective communication device and a Global Session Identifier (GSID) of the communication session.

14. The method of claim 13, wherein the statistics of the RTCP media stream comprise one of a packet loss value, an inter-arrival jitter value, and a packet round trip time value.

15. The system of claim 13, wherein the URI of the respective communication device further comprises a user communication device identifier that identifies a specific communication device of a user.

16. The method of claim 12, wherein of the one or more communication devices is a first communication device of a user and wherein the message to dynamically change the configuration of the media stream of the communication session is an instruction to add a second communication device of the user to the communication session.

17. The method of claim 12, wherein the communication session is a conference call, wherein one of the one or more communication devices is a first conference bridge, and wherein the message to dynamically change the configuration of the media stream of the communication session is an instruction for a second conference bridge to dynamically replace the first conference bridge in the conference call.

18. The method of claim 12, wherein one of the one or more communication devices is a media server and wherein the message to dynamically change the configuration of the media stream of the communication session is an instruction to dynamically shuffle the media stream of the communication session to a different media server.

19. The method of claim 12, wherein one of the one or more communication devices uses a first codec for the media stream of the communication session and wherein the message to dynamically change the configuration of the media stream of the communication session is an instruction for the one of the one or more communication devices to switch to a second codec for the media stream of the communication session.

20. The method of claim 12, wherein the message to dynamically change the configuration of the media stream of the communication session is one of:
an instruction to use an alternate number;
an instruction to change a route of the media stream of the communication session;
an instruction to re-queue the communication session using a higher priority after playing a preconfigured announcement;
an instruction to reboot a media resource;
an instruction to use a different Private Branch Exchange (PBX);
an instruction to temporarily log out one of the one or more communication devices;
an instruction to terminate the communication session for one or more alternate communication devices of a user;
an instruction to disable a first Back-to-Back User Agent (B2BUA) in the media stream;
an instruction to switch the first B2BUA in the media stream with a second B2BUA;
an instruction to switch a first recorder in the media stream with a second recorder;
an instruction to remove a first voice translator from the media stream;
an instruction to switch the first voice translator of the media stream with a second voice translator;
an instruction to remove a first voice-to-text converter of the media stream;
an instruction to switch from the first voice-to-text converter of the media stream to a second voice-to-text converter;
an instruction to switch from a first Session Border Controller (SBC) to a second SBC;
an instruction to start a new virtual thread for an application in the media stream and switch to the new virtual thread for the application in the media stream;
an instruction to switch from a first Interactive Voice Response (IVR) system to a second IVR system; or
an instruction to reboot the one of the one or more communication devices.

* * * * *

UNITED STATES PATENT AND TRADEMARK OFFICE
CERTIFICATE OF CORRECTION

PATENT NO. : 10,412,126 B2
APPLICATION NO. : 15/283959
DATED : September 10, 2019
INVENTOR(S) : Anirudh Patel et al.

Page 1 of 1

It is certified that error appears in the above-identified patent and that said Letters Patent is hereby corrected as shown below:

In the Claims

At Column 15, Line 65, after "wherein" insert --one-- therein.

Signed and Sealed this
Nineteenth Day of November, 2019

Andrei Iancu
*Director of the United States Patent and Trademark Office*